(12) United States Patent
Thompson et al.

(10) Patent No.: US 11,226,412 B2
(45) Date of Patent: *Jan. 18, 2022

(54) USE OF MULTI-BEAM SONAR SYSTEMS TO GENERATE POINT CLOUD DATA AND MODELS, AND DATA REGISTRATION IN UNDERWATER METROLOGY APPLICATIONS

(71) Applicant: Teledyne RESON A/S, Thousand Oaks, CA (US)

(72) Inventors: Roger Lee Thompson, Kirkland, WA (US); Jason Leonard Seawall, Seattle, WA (US); Scott Thomas Bachelor, Poulsbo, WA (US); Nicholas Lesnikowski, Seattle, WA (US)

(73) Assignee: Teledyne RESON A/S, Thousand Oaks, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/265,500

(22) Filed: Feb. 1, 2019

(65) Prior Publication Data

US 2019/0235075 A1   Aug. 1, 2019

Related U.S. Application Data

(63) Continuation of application No. 15/842,648, filed on Dec. 14, 2017, now Pat. No. 10,197,674, which is a continuation of application No. 13/734,867, filed on Jan. 4, 2013, now Pat. No. 9,846,232.

(60) Provisional application No. 61/583,558, filed on Jan. 5, 2012.

(51) Int. Cl.
*G01S 15/89* (2006.01)

(52) U.S. Cl.
CPC .................................. *G01S 15/89* (2013.01)

(58) Field of Classification Search
CPC .......... G01S 15/00; G01S 15/74; G01S 15/87; G01S 15/89

See application file for complete search history.

(56) References Cited

U.S. PATENT DOCUMENTS

| | | |
|---|---|---|
| 3,195,677 A | 7/1965 | Hillery et al. |
| 3,409,868 A | 11/1968 | Salathiel |
| 4,219,886 A | 8/1980 | Anderson |
| 5,022,015 A | 6/1991 | Gilmour |
| 7,542,376 B1 | 6/2009 | Thompson et al. |
| 7,606,114 B2 | 10/2009 | Bachelor et al. |

(Continued)

OTHER PUBLICATIONS

Miller, J.H., Potty, G.R. and Sarangapani, S., 2009. Acoustic detection and monitoring for transportation infrastructure security. (Year: 2009).*

(Continued)

*Primary Examiner* — Luke D Ratcliffe
(74) *Attorney, Agent, or Firm* — Knobbe, Martens, Olson and Bear, LLP

(57) ABSTRACT

Use of sonar systems to collect dimensional and relational data for use in metrology, mapping, object and structure detection, survey and evaluation applications is disclosed. Systems and methods for collecting underwater data sets, using registration targets, for data registration of underwater acoustic data sets, as well as for data registration of underwater acoustic data sets with above-the-waterline data sets (e.g., laser-based data sets) are described.

25 Claims, 9 Drawing Sheets

(56) References Cited

U.S. PATENT DOCUMENTS

| | | | |
|---|---|---|---|
| 7,889,600 | B2 | 2/2011 | Thompson et al. |
| 9,846,232 | B1 | 12/2017 | Thompson et al. |
| 10,197,674 | B2 | 2/2019 | Thompson et al. |
| 2012/0099395 | A1 | 4/2012 | Debrunner et al. |

OTHER PUBLICATIONS

AUK North 4th Well Metrology, THSIS, dated Feb. 29, 2012, 16 pages.

Fraserburgh Blueview Trial Layout, dated Oct. 27, 2011, 1 page.

Image A, 10 Spherical Reference Targets (5 low, 5 high) secured on deck prior to departure to Talisman_Auk_North survey, Dec. 8, 2011, 1 page.

Image B, Blueview BV5000 with MB1350 head installed on deployment tripod along with the DTS telemetry system, secured on deck prior to departure to Talisman_Auk_North survey, Dec. 8, 2011, 1 page.

Image C, System control screens in Talisman_Auk_North survey room. DTS screen to left, Blueview ProScan screen to the right, Dec. 16, 2011, 1 page.

Image D, Overview of Blueview Spherical Reference Targets deployed for tests in drydock in Fraserburgh Scotland, Oct. 27, 2011, 1 page.

Image E, Detailed overview of Blueview Spherical Reference Targets deployed for tests in drydock in Fraserburgh Scotland, Oct. 27, 2011, p. 1.

Image F, Close up of Long Base Line (LBL) transponder deployed for tests in drydock in Fraserburgh Scotland. Part of system used to "check" Blueview scan accuracy, Oct. 27, 2011, p. 1.

MeshLab, SourceForge.net; http://meshlab.sourceforge.net/, printed Apr. 7, 2016, 7 pages.

Ridao et al., Visual Inspection of Hydroelectric Dams Using an Autonomous Underwater Vehicle, J Field Robotics, Nov./Dec. 2010, vol. 27, Issue 6, pp. 759-778.

RPSEA, 2011 UDW TAC Project 09121-3300-08 Power Point Presentation, dated Jan. 23, 2012, 13 pages.

Seatronics Purchase Quotation, dated Sep. 28, 2011, 5 pages.

Teledyne Blueview, Spool Piece Metrology Applications Utilizing BV5000 3D Scanning Sonar, dated Jan. 24, 2012, 18 pages.

Teledyne Blueview, 3D Multibeam Scanning Sonar; http://www.blueview.com/products/3d-multibeam-scanning-sonar/3/m, printed Apr. 7, 2016, 10 pages.

Teledyne Blueview, Leica Cyclone Software; http://www.blueview.com/software/3d-mechanical-scanning/leica-cyclone-software/, printed Apr. 7, 2016, 8 pages.

\* cited by examiner

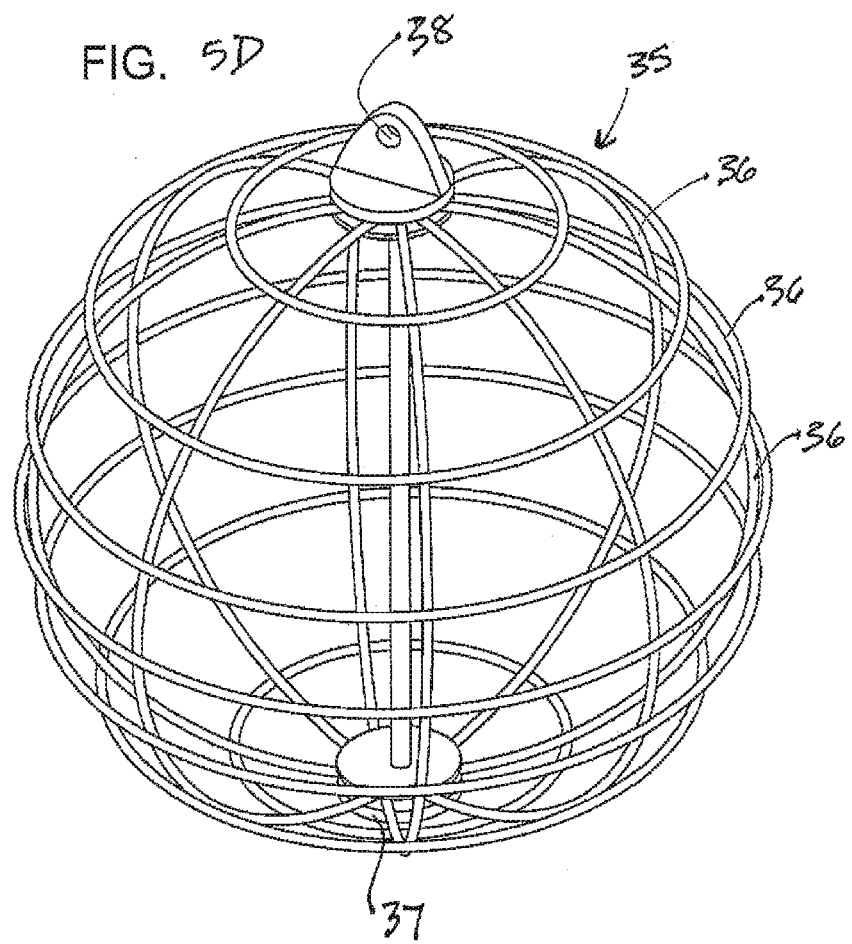

USE OF MULTI-BEAM SONAR SYSTEMS TO GENERATE POINT CLOUD DATA AND MODELS, AND DATA REGISTRATION IN UNDERWATER METROLOGY APPLICATIONS

CROSS-REFERENCE TO PRIORITY APPLICATION

This application is a continuation of U.S. application Ser. No. 15/842,648, filed Dec. 14, 2017, now U.S. Pat. No. 10,197,674, which is a continuation of U.S. application Ser. No. 13/734,867, filed Jan. 4, 2013, now U.S. Pat. No. 9,846,232, which claims priority to U.S. Provisional Patent Application No. 61/583,558, filed Jan. 5, 2012. These applications are incorporated herein by reference in their entirety.

BACKGROUND 3D laser scanning techniques are commonly used for terrestrial-based 3D mapping and metrology applications. Multiple data sets covering different, generally overlapping areas are collected and then registered and aggregated to form larger data sets. The techniques for collecting and registering laser data, including surface matching of overlapping data sets, take advantage of the high resolution of the data and the availability of distinctive features within the data sets. Co-registration of GPS and LIDAR generated data may improve the accuracy of data sets. Methods for registration of LIDAR data with optical imagery to improve 3D modeling simulations are also known.

Underwater terrain, is typically mapped using acoustic bathymeny systems. Multibeam echosounders, which generally incorporate many narrow adjacent beams arranged in a fan-like swath, can provide high angular resolution and accuracy. The echosounders are generally mounted on vessels that steer overlapping swaths over the target terrain to collect mapping data. The beams may update frequently, allowing reasonably fast vessel speed while maintaining full coverage of the seafloor. Attitude sensors mounted on the vessel may provide data for correction of the boat's roll, pitch and yaw on the ocean surface, and a gyrocompass may be provided for accurate heading information. The Global Positioning System (or other Global Navigation Satellite System (GNSS)) may be used to position the soundings with respect to the surface of the earth. Sound speed profiles (speed of sound in water as a function of depth) of the water column may be collected to correct for refraction or "raybending" of the sound waves as a result of non-uniform water column characteristics such as temperature, conductivity, and pressure. A computer system may process all or a portion of this data, correcting for the various factors, as well as for the angle of each individual beam. The resulting sounding measurements are then processed manually, semi-automatically or automatically (in limited circumstances) to produce a map of the underwater terrain.

While the acoustic bathymetry systems described above provide adequate resolution for many purposes, higher resolution underwater mapping and metrology has been difficult to achieve. Optical video cameras are well known and have been in use for many years. Underwater optical video cameras generally use analog or digital video transmission techniques and can provide satisfactory resolution and viewing range in illuminated, clear underwater conditions. Underwater conditions are often not conducive to optical cameras, however, because illumination is poor or because the water lacks clarity. Other types of optoelectronic sensors have also been developed, including various types of spectroscopic systems. Sensors that rely on optics, however, such as spectroscopic systems, have limited viewing range in dark, murky or turbid underwater conditions. For this reason, they have limited use in underwater environments and the information they provide can be quite unreliable.

High resolution imaging sonar (i.e., acoustic) systems have been available and are used in many different underwater applications. Sonar imaging systems provide satisfactory resolution and viewing range in many different water conditions, including murky and turbid underwater conditions. Imaging sonar systems designed for visualization and/or object detection generally scan a fan-shaped beam in a given area by rotating the system or translating it along a line, generating data points and forming images in the direction of the beam rotation or translation. In general, the angle through which the beam is moved is relatively small, the fan-shaped beam has a narrow angle, and the transmitted pulse is short.

Multi-beam sonar systems, including frequency-steerable multi-beam sonar systems, are well known and may be used for many types of 2D and 3D imaging applications, as well as bathymetry, object detection, surveillance and other types of applications. Exemplary frequency-steerable multi-beam acoustic systems, and other types of imaging systems, are disclosed in U.S. Pat. Nos. 7,606,114, 7,542,376 and 7,889,600, which are incorporated herein by reference in their entireties. These systems are capable of providing high resolution underwater imagery.

Underwater installations of various types, such as pipelines, cabling, tunnels, support structures, rigs and the like may require precise, high resolution measurement of underwater components and structures for installation, monitoring and repair purposes. Spoolpiece metrology, which is the measurement of the relative separation and angle between flanges where underwater pipe sections are connected, or where pipe sections are connected to fixed structures, is one exemplary underwater metrology application that requires high resolution underwater data collection. This metrology application requires highly accurate and precise data, to ensure that pipe and flange connections match and to accurately determine dimensional flange and pipe fabrication requirements.

One standard method of spoolpiece metrology utilizes Long Baseline (LBL) transponders placed in locations near the pipeline or underwater structure of interest and measures ranges between the transponders very accurately. An array of 6-10 transponders is typically deployed on the seabed, on the pipeline, structure and on the flanges. All the inter-transponder ranges are measured and used to compute the relative position and bearing between the flanges. This process, including deployment, range measurement and recovery, generally requires significant vessel time (on the order of 12-18 hours), with vessel costs often ranging between £60,000 and £110,000 per day. This system, while accurate, is a very high cost and time intensive system.

Using a sonar system to collect precise dimensional and relational data could dramatically reduce the amount of vessel time required and, thus, the cost in various underwater metrology applications. Use of a high resolution sonar system may provide more complete, higher resolution data and imaging as well. This type of system would be useful for many types of underwater metrology, object and structure detection, survey and evaluation applications. Techniques for registration of multiple data sets are required for implementation of such high resolution imaging sonar systems in underwater metrology applications.

Registration of underwater acoustic data with terrestrial data collected using laser-based systems is also challenging and, if done accurately, would provide comprehensive survey and mapping information. Because laser-based data is generally collected above the water line, and acoustic data is generally collected below the water line, and because there are few fixed, distinctive features at or near the water-air interface, registration of above the waterline and below the waterline data sets using common data features isn't feasible. Tidal and water level fluctuations, and wave action, eliminate the use of simple waterline-based registration systems for registering above and below the water line data sets, even when adjusted to account for tidal fluctuations. Registration systems that provide accurate registration of above waterline data sets with underwater data sets would also be useful for many types of survey, mapping and metrology applications.

SUMMARY

Registration targets for facilitating registration of underwater acoustic data sets are described and shown herein. In one embodiment, a geometrical registration target has a geometrical framework structure and at least one projection extending from the structure, the projection provided as a shaped structure having a distinctive top to bottom and/or side to side profile and high acoustic visibility. In another embodiment, a registration target comprises a base structure, a shaft extending from the base, and a shaped target mounted on the shaft or an extension from the shaft, wherein the shaped target has a distinctive top to bottom and/or side to side profile and high acoustic visibility. In another embodiment, a registration target comprises a three-dimensional spherical form. In another embodiment, a registration target is configured to extend both above and below the waterline.

In another aspect, methods for registering underwater acoustic data sets are described, comprising: securely placing one or more registration targets having a distinctive profile and high acoustic visibility in an underwater location in proximity to one or more desired target objects; placing one or more underwater acoustic data collection systems in proximity to the registration target(s) and desired target object(s); collecting a plurality of acoustic data sets, each data set incorporating at least a portion of at least one registration target; mapping each acoustic data set into three-dimensional space in a point cloud format; and registering the plurality of data sets by aligning the registration target(s) forming a part of each data set.

In another aspect, methods for modeling underwater target objects in three dimensional data sets are described, comprising: securely and detachably mounting one or more registration targets having two dimensional structural elements and at least one shaped target projection flush against, or on a plane separated a known distance from, a planar face of the underwater target object(s); collecting a plurality of acoustic data sets in a spherical point cloud format, with each data set incorporating at least a portion of at least on registration target; and registering the plurality of data sets by aligning the registration target(s) forming a part of each data set.

According to yet another aspect, methods for registering data sets collected above the waterline using optical data collection systems with data sets collected below the waterline using acoustic data collection systems are described, comprising: securely mounting one or more registration targets configured to extend both above and below the waterline with at least a portion of the optically visible targets positioned above the waterline and at least a portion of the acoustically visible targets positioned below the waterline; collecting a plurality of optical data sets in a above the waterline and a plurality of acoustic data sets below the water line, with each data set incorporating at least a portion of at least on registration target; mapping each acoustic data set into three-dimensional space in a point cloud format; and registering the plurality of data sets by aligning the registration target(s) forming a part of each data set.

BRIEF DESCRIPTION OF THE FIGURES

FIG. 5D shows a schematic drawing of an exemplary spherical registration target having a ribbed configuration.

DETAILED DESCRIPTION

Several systems and methods for collecting underwater data sets, and for data registration of underwater acoustic data sets, as well as for data registration of underwater acoustic data sets with above-the-waterline data sets (e.g., laser-based data sets) are described below.

Data Collection and Modeling

Figure 1A:
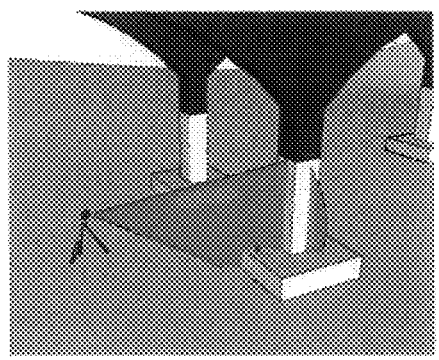
FIG. 1A shows a schematic diagram illustrating a (mechanical) scanning multi-beam sonar system mounted on a stationary platform that may be used to produce data in a point cloud format by scanning a thin vertical sonar slice around underwater structures and objects.
Figure 1B:
FIG. 1B shows an image produced using data collected using a scanning multi-beam sonar system as schematically illustrated in FIG. 1A.

Multi-beam sonar systems may be scanned to collect data in a point cloud format. FIG. 1A shows a schematic diagram illustrating a (mechanical) scanning multi-beam sonar system mounted on a stationary platform (e.g., a tripod) that may be used to produce data in a point cloud format by scanning a thin vertical sonar slice around underwater structures and objects. Each profile slice is mapped into 3D space to create a point cloud from which range and angle measurements between objects can be determined. An image generated using point cloud data collected using a scanning multi-beam sonar system mounted and positioned as shown in FIG. 1A is illustrated in FIG. 1B.

Figure 2A:
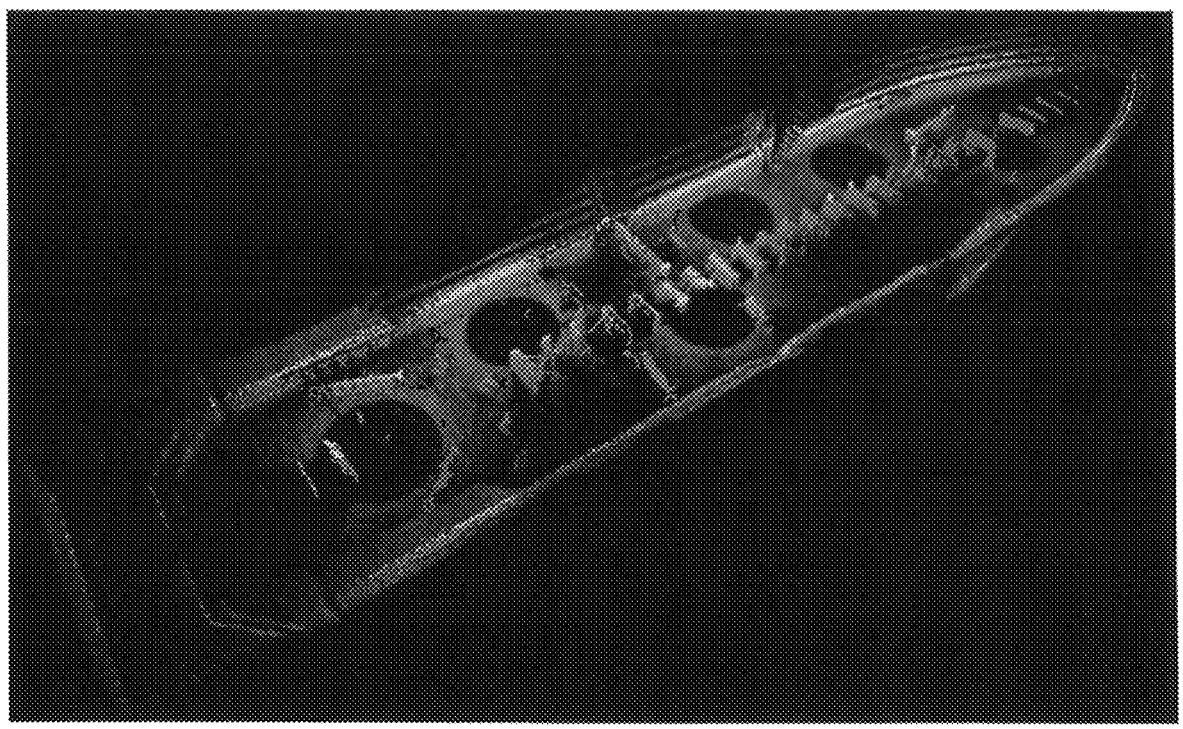
FIG. 2A shows an image depicting sonar data of underwater pipe and flange structures.
Figure 2B:
FIG. 2B shows the pipe and flange structures modeled from the point cloud data collected.
Figure 2C:
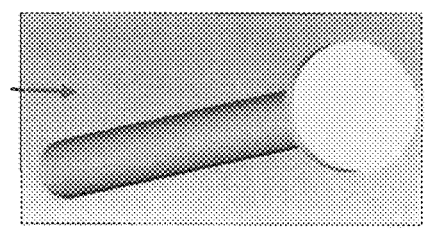
FIG. 2C shows an image from a CAD model generated using the point cloud data collected from the sonar device.

Data collected or assembled in a point cloud format as described above may also be used to create accurate models using existing tools, such as computer-aided-design programs, e.g., CAD software. FIGS. 2A-2C show the progression of 3D sonar data as collected (FIG. 2A), the mapping of the sonar data into 3D space in a point cloud format showing objects (pipes and flanges) in a 3D representation (FIG. 2B), and a CAD model (FIG. 2C) of one of the pipe/flange combinations generated based on the point cloud data. Based on CAD and other models, flanges and pipes (and other structures) may be fabricated to match the existing underwater structures, and then interfaced and fastened with the existing underwater structures in a convenient and expedient manner. High resolution imaging sonar systems, as described herein, provide accurate dimensional information and may be processed to provide the information in a variety of formats for use in fabrication, assembly, and the like.

Acoustic Data to Acoustic Data Registration

Methods and systems of the present invention introduce "artificial" registration targets in underwater areas where little to no structure is present, and position one or more registration targets between overlapping scan data sets to enable accurate registration of data sets. These targets facilitate the alignment of overlapping data sets by providing reference points allowing multiple data sets to be "snapped" together.

Figure 3A:
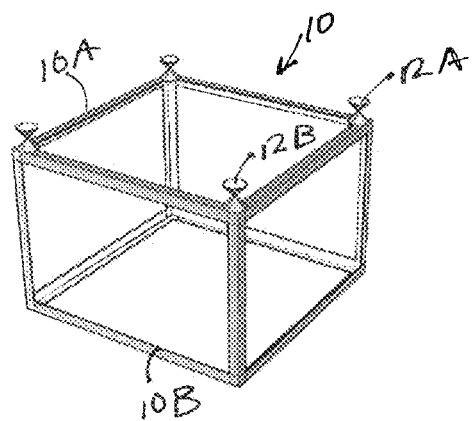
FIG. 3A shows a schematic perspective view of an exemplary geometric registration target of the present invention.
Figure 3B:
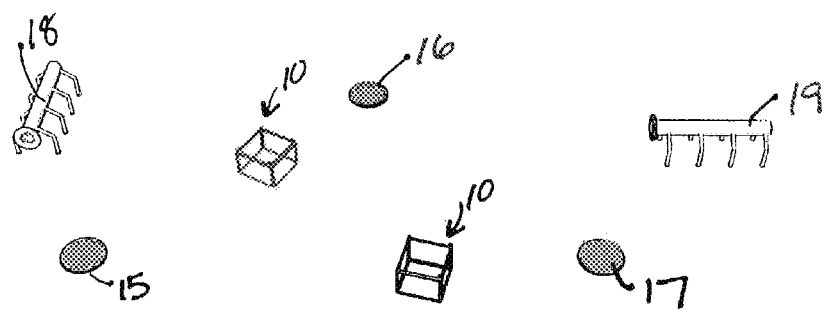
FIG. 3B shows a schematic illustration of exemplary placement of geometrical registration targets in relation to data collection locations and target objects.

Artificial underwater registration targets may take a variety of forms. In one embodiment, the artificial registration target is provided as a three-dimensional geometrical structure having acoustically opaque elements and/or surfaces. FIG. 3A shows an exemplary 3D geometrical registration target, and FIG. 3B shows exemplary placement of artificial registration targets vis a vis scan locations and objects.

Geometric registration target 10, illustrated in FIG. 3A, has a three-dimensional rectangular structure with a plurality of connected elements 10A, 10B, etc., illustrated as linear bars, providing a rectangular framework that is acoustically dense and distinguishable from the underwater surroundings, the objects being investigated, and the ocean floor. Suitable materials are well known and include various types of metals, plastics, and the like. The framework structure is generally "open," permitting at least limited water penetration and flow, and the structure is heavy enough to be positioned in a stable and stationary position on the sea floor or an underwater platform or structure. The registration framework may be weighted to facilitate placement in a desired orientation, or weights may be attached to the framework structure, prior to or following placement, to facilitate stable positioning of the structure.

While registration target 10 is illustrated as a rectangular structure, other geometrical shapes may be provided—e.g. triangular, trapezoidal, etc. Similarly, while the framework bars are illustrated as linear structures, it will be appreciated that curved or more complex linear structures may be provided, and that different framework bars may have different structures—e.g., profiles, sizes, patterns, etc.—that provide differentiated structures for data registration. The framework bars may be perforated, or marked, with distinctive shapes and patterns of perforations, markings, and the like, to provide additional distinctive points of reference for data registration.

Geometrical registration targets 10 additionally have one or more associated projections 12A, 12B, etc., extending from the geometrical framework. Projections 12A, 12B, etc., are preferably provided as shaped structures having a variable top to bottom and/or side to side profiles. One suitable shape is an hourglass or double inverted cone shape, as shown. Other types of shaped structures, including conical shapes, triangular shapes, and the like, are suitable. These types of shaped structures are distinctive in collected data sets and provide good registration accuracy. Projections may be provided at one or more corners of a registration target framework, as illustrated in FIG. 3A, and they may alternatively or additionally be provided elsewhere on the target framework structure. In some embodiments, projections having different shapes and three-dimensional profiles are provided at different locations on the registration target, again providing differentiated structures and distinctive points of reference for data registration.

FIG. 3B shows exemplary placement of geometrical registration targets 10 in relation to scan locations 15, 16, 17 and objects 18, 19. Objects 18 and 19 are illustrated as spoolpieces, or pipeline sections, that need to be joined to one another, or to other pipeline or well structures, or to other underwater structures. Methods of the present invention may involve placement of one or more geometrical registration targets 10 in proximity to, and generally between, one or more metrology target(s), such as pipeline or underwater objects or structures. The registration targets are securely placed on the sea floor or on an underwater structure and anchored, if necessary, to provide stable and stationary positioning of the registration targets. Underwater acoustic data collection systems (e.g., multibeam sonar systems) are placed, or maneuvered in proximity to the registration target(s) and metrology (object) target(s). Multiple data collection systems may be provided and used simultaneously, or a single data collection system may be positioned, sequentially, at multiple scan sites for data collection.

Data is preferably collected in a spherical point cloud format, with each data set incorporating at least a portion of at least one registration target. Registration of the data sets may then be accomplished by aligning reference points, and areas, of the geometrical registration targets forming a part of each data set. Because the objects and the registration targets are stationary, it is not essential that the acoustic data collection systems be maintained in a stationary condition. Data sets incorporating at least a portion of one or more registration targets may be collected from movable, or moving, acoustic systems and registered, accurately, using methods and systems of the present invention.

Figure 4A:
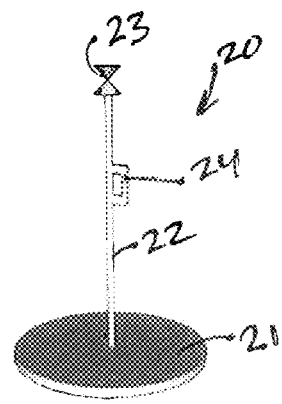
FIG. 4A shows a schematic perspective view of an exemplary distributed point registration target of the present invention.
Figure 4B:
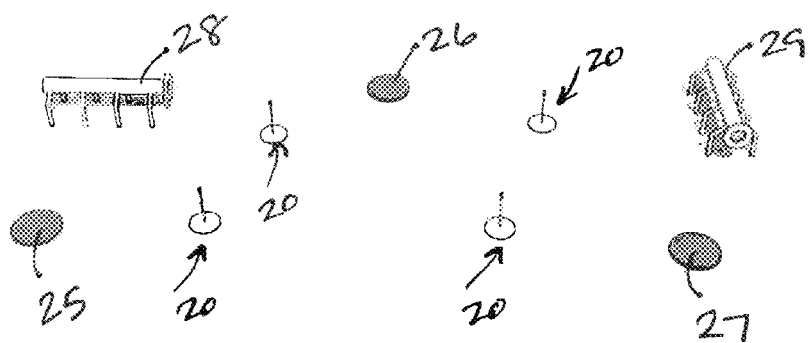
FIG. 4B shows a schematic illustration of exemplary placement of distributed point registration targets in relation to data collection locations and target objects.

An alternative type of registration target is illustrated in FIG. 4A; exemplary placement of this type of target vis a vis scan locations and objects targeted for investigation is shown in FIG. 4B.

Registration target 20 illustrated in FIG. 4A is referred to as a distributed point target. Each distributed point target 20 comprises a base 21 providing solid, footing for stable placement of the structure; a shaft 22 for elevating the registration target with respect to the base and the sea floor or structure, and a shaped projection 23 to facilitate data registration. Base 21 is generally large enough and heavy enough to be positioned in a stable and stationary position on the sea floor or on an underwater platform or structure. Other types of base structures may be used, depending on the nature of the sea floor, undersea conditions, and the like. The registration target may additionally incorporate a handle 24 or a similar structure to facilitate transport and positioning of the registration target.

Shaped projection 23 is preferably provided as a shaped structure having a variable top to bottom and/or side to side profile. One suitable shape is an hourglass or double inverted cone shape, as shown. Other types of shaped targets, including conical targets, triangular targets, and the like, are suitable. These types of shaped targets are distinctive in collected data sets and provide good registration accuracy. In alternative embodiments, multiple shaped targets may be provided on multiple shafts extending from a base structure, or on one or more limbs projecting from a common shaft. In some embodiments, a tripod-like structure may be substituted for the base and shaft elements. In other embodiments, an inverted tripod structure may project from the base to support multiple shaped targets. In some embodiments, targets having different shapes and three-dimensional profiles are provided at different locations on the registration target, again providing differentiated structures for data registration. These types of shaped structures provide good registration accuracy.

FIG. 4B shows exemplary placement of registration targets 20 in relation to scan locations 25, 26, 27 and objects 28, 29. Objects 28 and 29 are spoolpieces, or pipeline sections, that need to be accurately positioned and joined to one another, or to other pipeline or well structures, or to other underwater structures. Methods of the present invention may involve placement of one or more registration targets 20 in proximity to, and generally between, one or more metrology target(s), such as pipeline or underwater objects or structures. The registration targets 20 are securely placed on the sea floor or on an underwater structure and anchored, if necessary, to provide stable and stationary positioning of the targets. Underwater acoustic data collection systems (e.g., multibeam sonar systems) are placed, or maneuvered in proximity to the registration target(s) and metrology target(s). Multiple data collection systems may be provided and used simultaneously, or a single data collection system may be positioned, sequentially, at multiple scan sites for data collection.

Data is preferably collected in a spherical point cloud format, with each data set incorporating at least a portion of at least one registration target. Registration of the data sets may then be accomplished by aligning reference points, and areas, of the geometrical registration targets forming a part of each data set. Because the objects and the registration targets are stationary, it is not essential that the acoustic data collection systems be maintained in a stationary condition. Data sets incorporating at least a portion of one or more registration targets may be collected from movable, or moving, acoustic systems and registered, accurately, using methods and systems of the present invention.

Figure 5A:
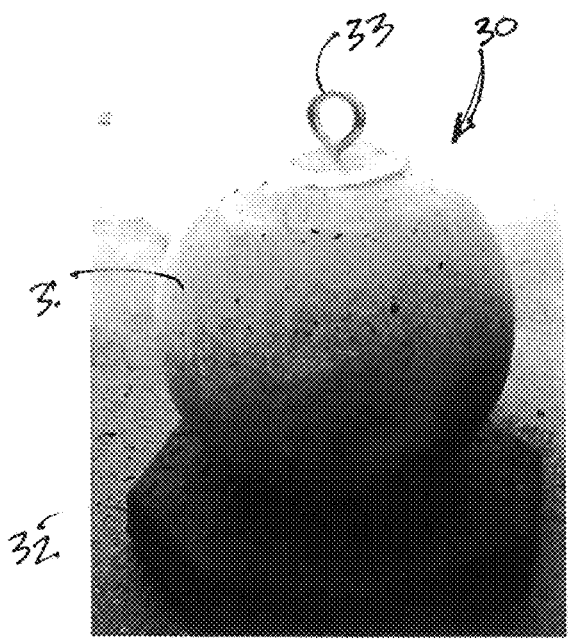
FIG. 5A shows an image of an exemplary spherical registration target.

FIG. 5A shows another embodiment of a registration target of the present invention having a generally spherical configuration. Target 30 may comprise a three-dimensional, generally spherical form 31 having a solid or hollow construction. For applications in which data is collected at the sea floor or near a structure, spherical form 31 may be mounted on a stabilizing platform or base 32 suitable for supporting the target on an underlying surface. Target 30 may additionally incorporate or be associated with a hook or eye 33, or one or more similar structures, that may be used to move the target (using, e.g., a cable or hook) and position it for various data collection applications.

A plurality of spherical targets is generally placed within a pre-determined distance from the sonar device, within the field of data collection. When data is collected in a spherical point cloud format, it is preferred that at least three targets are placed within the data collection range of each sonar device, and that at least three targets are visible from each location within the data collection range to provide definitive points for registration of the point clouds.

Figure 5B:
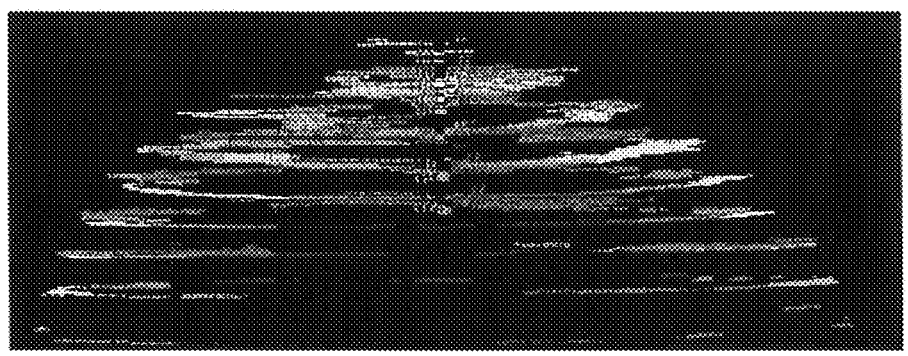
FIG. 5B shows an image of a point cloud data representation of a partial target.
Figure 5C:
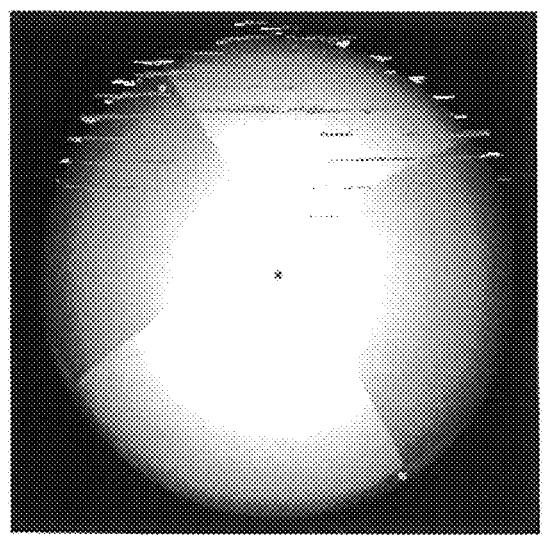
FIG. 5C shows a reference target modeled from the point cloud data.

FIG. 5B shows point cloud data representing a reference target of the type illustrated in FIG. 5A collected by mechanically scanning a multi-beam sonar system mounted on a fixed platform. FIG. 5C shows a model of the reference target generated from point cloud data using CAD software. Using the center of the model sphere as a reference point, multiple sonar scans including the area (and objects) surrounding the reference target can be registered.

FIG. 5D illustrates another embodiment of a spherical registration target 35 of the present invention. Registration target 35 has a plurality of ribs 36 forming an "open" spherical structure. In this embodiment, ribs 36 are oriented similarly to latitude and longitude lines, but it will be appreciated that many different types of open spherical frameworks could be constructed as registration targets. Registration target 35 additionally comprises a base 37 and a hook or eye 38, or one or more similar structures, that may be used to move the target (using, e.g., a cable or hook) and position it for various data collection applications.

Object Registration

Because acoustic based underwater scanning systems are generally less accurate than laser-based systems and they can experience relatively large beam spreading in range, it can be difficult to precisely define edges and surfaces that are typically used to accurately model objects (pipes, flanges, etc.) in three dimensional data sets. Methods and systems of the present invention are directed to improving the position and orientation accuracy of modeling specific objects from underwater acoustic point cloud data.

Methods of the present invention deploy targets on and around an object that help define and position specific physical details such as corners and surfaces in 3D space. The targets used are specifically designed to provide and delineate point and surface features in the data relative to the object of interest. These targets can also improve angle measurements of surfaces by effectively presenting a larger surface area for measurement and data collection.

Figure 6:
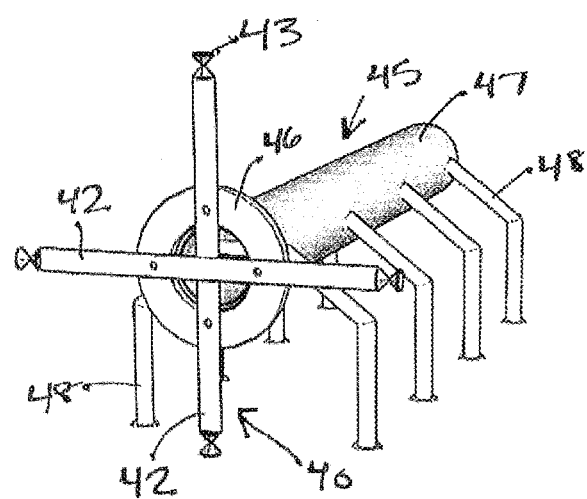
FIG. 6 shows a schematic illustration of an exemplary registration target mounted flush against, or at a known distance from, a target object.

FIG. 6 shows an exemplary registration target 40 comprising two dimensional structural elements, such as two or more bars 42 that intersect, and at least one shaped target 43 positioned at a distance from the intersection of bars 42. Registration target 40 is mounted flush against, or at a known distance from, a structural element of registration object 45, such as on a flange face 46 mounted on a pipeline section 47 having multiple legs 48. In some embodiments, the two dimensional registration target 40 is aligned on substantially the same plane as the plane of the face of flange 46. Various other types of two- and three-dimensional structures may be provided as registration targets. Additional bars may be provided, for example, in a spoke-like arrangement, and alternative geometrical framework structures may be used.

Shaped target 43 is preferably provided as a shaped structure having a variable top to bottom and/or side to side profile. One suitable shape is an hourglass or double inverted cone shape, as shown. Other types of shaped targets, including conical targets, triangular targets, and the like, are suitable. These types of shaped targets are distinctive in collected data sets and provide good registration accuracy.

Additional shaped targets having the same or different configurations may be provided at different locations along the bars to provide additional points for registration of data sets.

Placement of the registration target relative to the object facilitates accurate modeling of the target. One embodiment, in which a cross-shaped target structure is mounted flush to or a known distance from a flange face is illustrated in FIG. 6. The registration target is detachably and stably mounted on the object during data collection and is removed following data collection. Mechanical, magnetic, clip-based and other types of mounting systems may be used for detachably mounting one or more registration targets to the object. By placing the shaped registration point targets in the same plane as the flange face, but offset at some distance outside of the face, the modeler can more accurately define the center and orientation of the flange face.

Terrestrial (e.g., Laser) Data to Underwater (e.g., Acoustic) Data Registration

Comprehensive mapping and metrology may be performed when terrestrial data, such as laser scan data, is combined with underwater data, such as acoustic scan data. The main challenge with this task is registration of the terrestrial laser scan data with the underwater acoustic data, because neither the laser nor the acoustic data penetrates the water line, eliminating the possibility of using common data features for registration. Changing water levels due to tidal fluctuations and wave action generally exclude the use of a simple water line based registration point that would change position over time.

Figure 7:
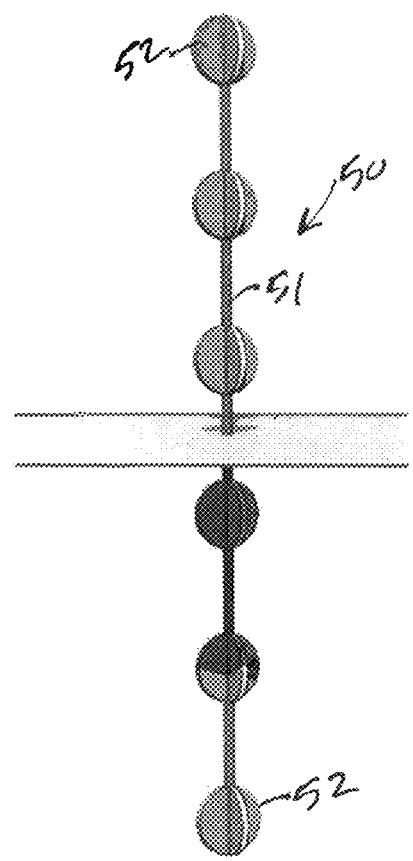
FIG. 7 shows a schematic illustration of an exemplary registration target of the present invention configured to extend both above and below a waterline for registration of above the waterline and below the waterline data sets.

Registration targets that are configured to extend both above and below the water line in all anticipated tidal and wave conditions are provided herein. FIG. 7 illustrates one embodiment of a registration target 50 of the present invention comprising a rod 51 having a plurality of shaped targets 52 distributed with known spacing along its length. Shaped targets 52 are illustrated as intersecting planar semi-circular structures, which present distinctive top to bottom and/or side to side profiles. Other suitable shapes include hourglass or double inverted cone shapes, conical targets, triangular targets, and the like, are suitable. These types of shaped targets are distinctive in collected data sets and provide good registration accuracy, both in above waterline and below waterline environments. Additional shaped targets having the same or different configurations may be provided at different locations along the rod(s) to provide additional points for registration of data sets.

Targets 52, in addition to having a shaped structure that is distinctive and easily identified in underwater acoustic data sets, also have distinctive optical properties that are easily distinguishable and identifiable using optical methodologies, such as laser-based data collection systems. Targets 52 are thus provided with optically reflective coatings, or have distinctive colors, refractive patterns, or the like. Different patterns and types of coatings, colors, and the like may be used on different locations along the rod(s) to provide additional points for registration of data sets.

Registration targets 52 are spaced and positioned such that the distance between the uppermost registration target and the lowermost registration target is greater than the sum of the difference between exceptional high and low tides and normal wave height. Multiple registration targets are mounted to a stationary or permanent structure in the scan area, so that registration targets are located both above and below the waterline regardless of the tide and wave activity.

Figure 8:
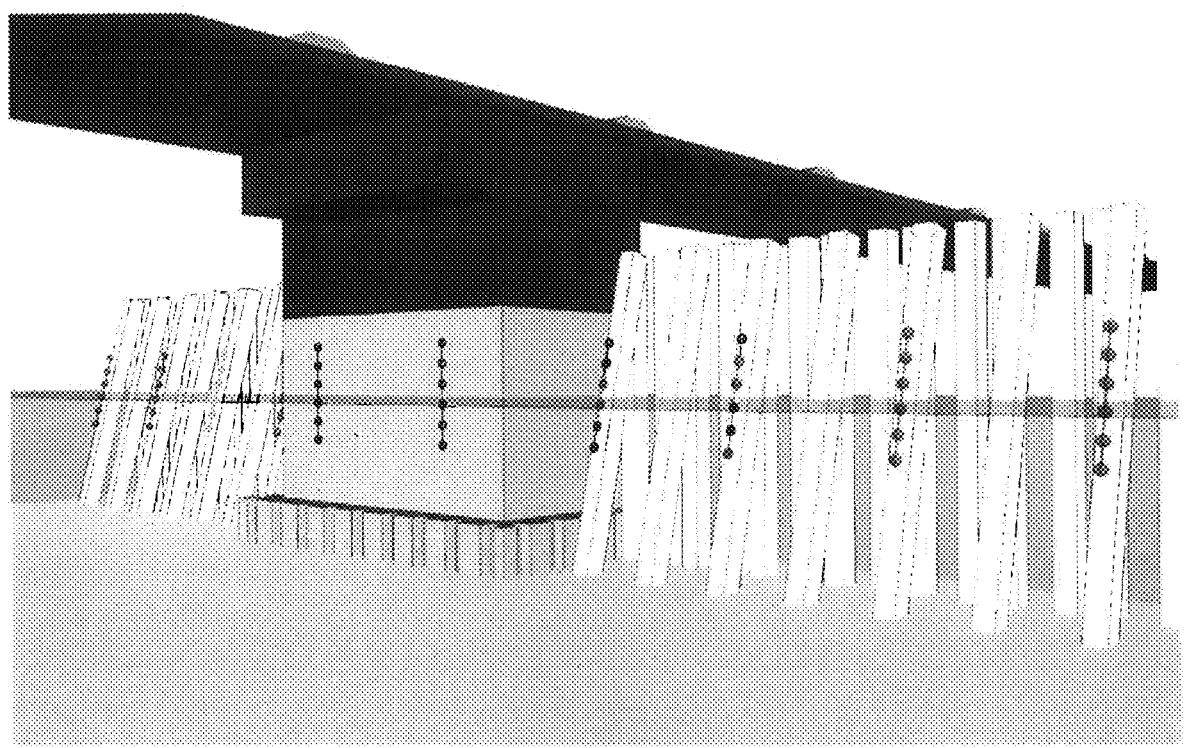
FIG. 8 shows a schematic illustration in which several registration targets of the type illustrated in FIG. 6 are mounted on and around a fixed structure, providing fixed reference points both above and below the waterline for data registration.

FIG. 8 shows an exemplary application in which several registration targets of the type illustrated in FIG. 6 are mounted on and around a bridge structure, with some of the targets above and some of targets below the water line. In alternative embodiments, registration targets having distinctive patterns or configurations of shaped targets may be provided and placed in predetermined locations to provide distinctive, fixed reference points for above the waterline and below the water line data registration.

EXAMPLE

The effectiveness of underwater sonar scanning technology using a BlueView Technologies BV5000-1350 3D mechanical scanning multi-beam frequency steered sonar system was tested. BlueView Technologies, Inc., 2151 N. Northlake Way, Suite 214, Seattle, Wash. 98103, www.blueview.com. The BV5000-1350 system operates at a frequency of 1.35 MHz and has 256 beams with a 1° beam width and a 0.18° beam spacing. The sonar field of view of 45×1°, with a sector/spherical scan area of 45-360°, and an update rate of up to 40 Hz. Data output formats include .son, .off and .xyz files. The system was operated with an integral pan & tilt mechanism and mechanical scanning system. BlueView ProScan software provided real-time scan control, monitoring and post processing, with export in point cloud formats.

A MeshLab point cloud viewer was used to view point cloud data collections and extract point-to-point measurements. Leica Geosystems' Cyclone-REGISTER 3D data registration and imaging software was used to clean 3D underwater data collected from the BlueView BV5000-1350 sonar system and combine and register multiple scans. Leica Geosystems' Cyclone-MODEL modeling software was used to model standard components and export them to a CAD file.

The BV5000-1350 3D mechanical scanning sonar system used for this demonstration consisted of an MB1350 sonar head calibrated in-house using an element spacing of 0.000587 in, a pan and tilt unit, and a tripod (about one meter high) for deployment. The following software was used during collection of sonar data: BlueView ProScan V3.3—Build 5401—BlueView's sonar data interface for sonar setup, collection and point cloud generation; and Meshlab v1.2.1, a 3D point cloud viewer that generates fully rotational 3D imagery and includes point-to-point measurement functions.

Four pipes with flanges were placed on supporting structures and arranged, in different orientations, in the dry-dock at distances of up to 30 m from the sonar head. Spherical reference targets having a configuration similar to that illustrated in FIG. 5A and a diameter of 0.386 m were placed in a triangular pattern within a 5-10 in distance from the sonar head. The reference targets were constructed from concrete, mounted to a polygonal base, and each had a metal eye protruding opposite the base for convenient handling. In general, at least 3 registration targets were visible from each location to provide definitive points for registration of point clouds.

A terrestrial laser scanning survey of the pipes, flanges and spherical references targets was conducted prior to flooding the dry-dock and used as a baseline for comparing the 3D sonar scans. All laser scanning data was collected using a Leica HDS C10 time of flight scanner. HDS blue and white targets were placed around the perimeter of the dry dock and in the cry dry dock itself prior to commencing laser scanning A minimum of three control targets were observed at the start and end of each scan. All control targets were assigned unique reference numbers to facilitate data processing. During scanning, all items of interest were scanned on a nominal 3 mm grid. To register the C10 data, the station files were imported into Cyclone and individually registered using the unique control targets. Auto-add cloud constraints were run on the point cloud data to tighten the registration.

The scanning multi-beam sonar system was calibrated, in the dry dock, by performing a scan where a flat surface of the dry dock was visible. An XYZ file was imported into point cloud software, the flatness of the surface was assessed, and it was determined that a 3.5° tilt addition would be used for subsequent scans. The dry-dock was then filled with water and all pipes were referenced to marks on the dry-dock floor to confirm that there was no indication of shifting of any of the test pieces. The sound speed in water was measured as 1476 m/s and that value was entered into the Proscan software to provide proper scaling of the point cloud data.

Point cloud data sets were collected using the scanning multi-beam sonar system scanned at 360° with scan speeds of 0.5°/sec and 1°/sec. The scanning locations were chosen to produce significant point cloud detail of the pipes and flanges. To register the 1° data, the xyz files were imported into Cyclone, the spherical targets were modeled, and the center of each sphere was given a unique reference number. Model spheres were fit to all the sonar point cloud elements created by the spherical reference targets. Alternate targets, e.g., cross-shaped targets, were used to supplement the areas of the dry dock where three spherical targets were not visible.

Multiple sonar scans were registered together to generate a composite point cloud of the entire surveyed area. Pipe and flange CAD models were created from the point cloud data, and ranges and angles between flanges were determined using CAD models. The average distance uncertainty compared to the laser measurements for flanges spaced at a distance of 30 m was 6 cm, and the average angle uncertainty compared to the laser measurements for flanges spaced at a distance of 30 m was 0.8°. The average distance uncertainty compared to the laser measurements for flanges spaced at a distance of 40 m was 7 cm, and the average angle uncertainty compared to the laser measurements for flanges spaced at a distance of 30 m was 0.9°. The multi-beam sonar system satisfied the accuracies generally required for spool piece metrology and demonstrated reduced setup complexity and reduced time for measurement. The sonar system produced data similar to that produced by laser scanning techniques and was generated using existing software, procedures and know-how.

It will be understood that the foregoing descriptions of various embodiments of methods and systems of the present invention are merely illustrative of the invention and its varied embodiments. Modifications to various aspects of the methods and systems of the present invention will be apparent to those skilled in the art and are intended to fall within the scope and purview of this disclosure and the following claims.

We claim:

1. A method of modeling underwater target object(s) in three dimensional data sets, the method comprising:
    detachably mounting one or more registration targets flush against, or on a plane separated a known distance from, a planar face of the underwater target object(s);
    collecting acoustic data sets in a spherical point cloud format, with each data set incorporating a portion of at least one registration target; and
    registering the acoustic data sets by aligning the registration target(s) forming a part of each data set.

2. The method of claim 1, wherein the plane of the registration target is parallel to the planar face of the underwater target object(s).

3. The method of claim 1, wherein the collecting of the acoustic data sets is by an acoustic data collection system comprising a scanning, multi-beam sonar system.

4. A system for modeling an underwater target object in three dimensional data sets, the system comprising:
    a processor configured to execute software to:
        collect acoustic data sets in a spherical point cloud format, with each data set incorporating a portion of at least one registration target; and
        register the acoustic data sets by aligning the registration target forming a part of each data set,
        wherein the registration target is detachably mounted having two dimensional or three dimensional structural elements flush against, or on a plane separated a known distance from, a planar face of the underwater target object.

5. The system of claim 4, wherein the plane of the registration target is parallel to the planar face of the underwater target object.

6. The system of claim 4, wherein detachably mounted comprises using one of a mechanical, magnetic or clip-based mounting system for mounting the registration target to the underwater target object.

7. The system of claim 4, wherein the registration target is removed from the planar face of the underwater target object following the collection of the acoustic data.

8. The system of claim 4, wherein the system comprises a plurality of stationary acoustic data collection systems that are operated substantially simultaneously.

9. The system of claim 4, wherein the system comprises a single acoustic data collection system that is positioned sequentially at multiple scan sites for data collection, wherein the collection of the acoustic data sets is performed while the acoustic data collection system is stationary.

10. The system of claim 4, wherein the system is in motion during collection of the acoustic data sets.

11. The system of claim 4, wherein the system comprises a three-dimensional mechanical scanning, multi-beam sonar system.

12. A method of mapping data sets collected above a waterline using an optical data collection system with data sets collected below the waterline using an acoustic data collection system, the method comprising:
    provisioning at least two registration targets to extend above and below the waterline, wherein each registration target comprises one of an optically visible target and an acoustically visible target;
    collecting a plurality of optical data sets above the waterline using an optical data collection system and a plurality of acoustic data sets below the water line using an acoustic data collection system, with each acoustic data set incorporating a portion of a registration target; and
    mapping each acoustic data set into a three-dimensional space in a point cloud format.

13. The method of claim 12, additionally comprising registering the data sets by aligning the registration target forming a part of each data set.

14. A system for registering data sets collected above a waterline with data sets collected below the waterline system, the system comprising:
    a plurality of registration targets provisioned to extend above and below the waterline, wherein each registration target comprises one of an optically visible target and an acoustically visible target, wherein the optically visible target is positioned above the waterline and the acoustically visible target is positioned below the waterline;

an acoustic data collection system configured to collect a plurality of acoustic data sets below the water line with each acoustic data set incorporating a portion of a registration target;

a processor configured to:
obtain optical data sets collected above the waterline using an optical data collection system; and
register the data sets by aligning the registration target forming a part of each data set.

15. The system of claim 14, wherein the processor is additionally configured to map each acoustic data set into a three-dimensional space in a point cloud format.

16. The system of claim 14, wherein the acoustic data collection system comprises a three-dimensional mechanical scanning, multi-beam sonar system.

17. The system of claim 14, wherein a registration target is configured to extend both above and below the waterline and comprises a rod-like structure having a plurality of targets distributed in a predetermined spacing along its length, wherein a portion of the targets are configured to extend below the waterline and are acoustically visible and a portion of the targets are configured to extend above the waterline and are optically visible.

18. The system of claim 14, wherein a registration target is configured such that the distance between an uppermost optically visible target and a lowermost acoustically visible target is greater than a sum of the difference between exceptional high tide and low tide and normal wave height.

19. A method for registering underwater acoustic data sets, the method comprising:
securely positioning at least three registration targets within a field of data collection at an underwater location, wherein the at least three registration targets are visible from each location within a data collection range;
collecting a plurality of acoustic data sets, each data set incorporating at least a portion of at least one of the at least three registration targets within the field of data collection at the underwater location; and
registering the plurality of data sets by aligning at least one of the one or more registration targets forming a part of each data set.

20. The method of claim 19, additionally comprising mapping each acoustic data set into a three-dimensional space in a point cloud format.

21. The method of claim 19, wherein collecting the plurality of acoustic data sets includes mechanically scanning by a multi-beam sonar system.

22. A system for registering underwater acoustic data sets, the system comprising:
one or more registration targets having a distinctive profile and high acoustic visibility being configured for three-dimensional applications within a field of data collection at an underwater location, wherein the one or more registration targets are visible from each location within a data collection range;
an acoustic data collection system configured to:
collect a plurality of acoustic data sets, each data set incorporating at least a portion of at least one of the one or more registration targets; and
register the plurality of data sets by aligning at least one of the one or more registration targets forming a part of each data set.

23. The system of claim 22, wherein the acoustic data collection system is additionally configured to map each acoustic data set into a three-dimensional space in a point cloud format.

24. The system of claim 22, wherein at least three registration targets are securely positioned within the field of data collection at the underwater location, wherein the at least three registration targets are visible from each location within the data collection range.

25. The system of claim 22, wherein the acoustic data collection system comprises a three-dimensional mechanical scanning, multi-beam sonar system.

* * * * *

UNITED STATES PATENT AND TRADEMARK OFFICE
CERTIFICATE OF CORRECTION

PATENT NO. : 11,226,412 B2
APPLICATION NO. : 16/265500
DATED : January 18, 2022
INVENTOR(S) : Thompson et al.

Page 1 of 1

It is certified that error appears in the above-identified patent and that said Letters Patent is hereby corrected as shown below:

In the Specification

Column 1, Line 32, delete "terrain," and insert --terrain--.

Column 1, Line 33, delete "bathymeny" and insert --bathymetry--.

Column 6, Line 61, delete "solid," and insert --solid--.

Column 10, Line 38, delete "in," and insert --m,--.

Column 10, Line 51, delete "in" and insert --m--.

Column 10, Line 64, delete "cry dry" and insert --dry--.

Column 10, Line 65, delete "scanning" and insert --scanning.--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*